(12) United States Patent
Wynblatt et al.

(10) Patent No.: US 6,219,696 B1
(45) Date of Patent: *Apr. 17, 2001

(54) SYSTEM FOR PROVIDING TARGETED INTERNET INFORMATION TO MOBILE AGENTS

(75) Inventors: Michael Wynblatt, Plainsboro; Arding Hsu, Kendall Park, both of NJ (US)

(73) Assignee: Siemens Corporate Research, Inc., Princeton, NJ (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/904,711

(22) Filed: Aug. 1, 1997

(51) Int. Cl.[7] .............................. G06F 19/00; G06F 17/60
(52) U.S. Cl. .......................... 709/218; 709/219; 709/227; 709/229; 705/14; 705/26
(58) Field of Search .................... 395/200.47, 200.48; 379/67, 88.7; 455/18, 49.1; 709/218, 229, 203; 705/26, 14

(56) References Cited

U.S. PATENT DOCUMENTS

| | | | |
|---|---|---|---|
| 5,133,081 | * 7/1992 | Mayo | 455/18 |
| 5,214,793 | * 5/1993 | Conway et al. | 455/49.1 |
| 5,262,860 | * 11/1993 | Fitzpatrick et al. | 358/142 |
| 5,504,482 | * 4/1996 | Schreder | 340/995 |
| 5,581,594 | 12/1996 | McAfee | 379/57 |
| 5,848,129 | * 12/1998 | Baker | 379/67 |
| 5,905,865 | * 5/1999 | Palmer et al. | 395/200.47 |
| 5,946,050 | * 8/1999 | Wolf | 348/553 |
| 5,948,066 | * 9/1999 | Whalen et al. | 709/229 |
| 5,950,173 | * 9/1999 | Perkowski | 705/26 |

FOREIGN PATENT DOCUMENTS

WO 97/27546  7/1997 (WO).

* cited by examiner

Primary Examiner—Dung C. Dinh
Assistant Examiner—Abdullahi E. Salad
(74) Attorney, Agent, or Firm—Donald B. Paschburg

(57) ABSTRACT

An Actively Broadcast URLs for Drive-By Internet Information (ABU-DaBII) system provides for the just-in-time distribution of information through mobile information terminals. The system involves the Internet as the primary source of the information and includes a mobile information terminal as the output device and a local agent which is locally operated. The mobile information terminal includes a receiver, a URL queue and a WWW renderer/browser. The local agent includes a short-range transmitter to distribute information pointers to the mobile information terminal and a mechanism for transferring data into the transmitter.

30 Claims, 2 Drawing Sheets

SYSTEM FOR PROVIDING TARGETED INTERNET INFORMATION TO MOBILE AGENTS

BACKGROUND OF THE INVENTION

1. Field of the Invention

The present invention relates to accessing information and more particularly to utilizing the Internet to receive targeted information through mobile information terminals.

2. Description of the Prior Art

Roadside advertisement, whether it be billboards or elaborate storefronts, is an important tool through which merchants and service providers let the public know about their products. As a potential customer drives past in their automobile, they see the advertisement, and become aware that the product exists, or are reminded of it. The major drawback of roadside advertisement is that there is little or no opportunity for the customer to follow up if they are interested. The information that can be provided is limited, and there are few channels available to provide the customer with more information. In the case of a billboard, there is no opportunity, other than an active effort by the customer. In the case of a store front, the customer might stop at the store, but probably not if he is en route elsewhere or only has a passing interest in the product. Even if the customer is likely to stop, the merchant needs some way to differentiate his product from that of the competitors' product, or risk the customer stopping elsewhere instead.

Some very large organizations have used short-range radio broadcasts to send additional information to customers. Such systems allow a much larger amount of information to be transferred, but they have several restrictions which limit their use. First, they are expensive. Second, they require that the customer spend a large amount of time within the broadcast range in order to hear the information. In practice, this means that only organizations occupying geographically large areas can make use of them. Even when satisfying these constraints, such systems still lack the interactivity necessary to deliver custom information which can attract a customer.

The advent of automobile based Internet browsers in the next few years will give a new opportunity for merchants to make use of roadside advertisements. Billboards and storefronts can be equipped with short-range data transmitters which broadcast very short transmissions to passing automobiles. Rather than carrying lengthy product information, these transmissions can carry short Internet Uniform Resource Locator codes (URLs). Once the automobile receives a URL, a driver with an Internet browser can choose to "follow" it, and access the World Wide Web document to which it points, or the driver can choose to ignore the URL. The resulting document, and others which it links to, can contain an arbitrary amount of information about any topic the vendor chooses, and can include interactivity to help the customer get the most relevant customized information for their interest.

SUMMARY OF THE INVENTION

The present invention is a system called Actively Broadcast URLs for Drive-By Internet Information, or ABU-DaBII, which allows access to Internet information customized to roadside advertisements. The present invention also provides a method for Internet web sites and audio programs to advertise themselves in an effective way.

The present invention involves the Internet as the primary source of the information. The present invention includes a mobile information terminal as the output device to the user and a local agent which is locally operated The system also provides for passing custom information to a remote Internet program. The mobile information terminal includes a receiver, a URL queue and a WWW renderer/browser. The local agent includes a short-range transmitter to distribute information pointers to the mobile information terminal and a mechanism for transferring data into the transmitter.

DETAILED DESCRIPTION OF THE INVENTION

Figure 1:
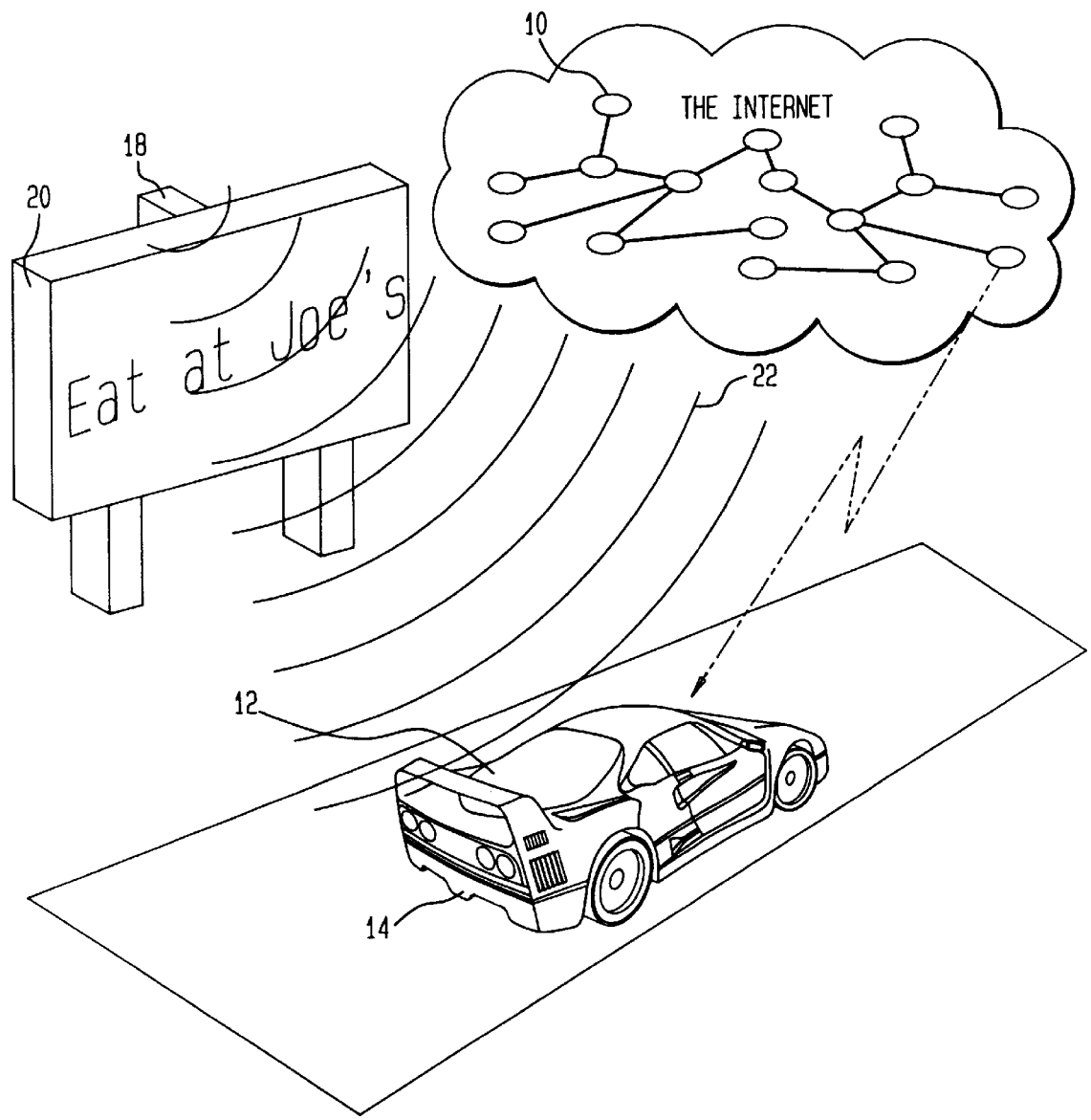
FIG. 1 illustrates the Actively Broadcast URLs for Drive-By Internet Information (ABU-DaBII) system of the present invention in operation.

The Actively Broadcast URLs for Drive-By Internet Information (ABU-DaBII) system provides for the just-in-time distribution of information to a mobile terminal. FIG. 1 illustrates the operation of the ABU-DaBII system as it provides drive-by-access to the Internet information. The system involves the Internet 10 as the primary source of the information and includes a mobile information terminal 12 as the output device, located in the vehicle 14 in this embodiment and a local agent (not shown) consisting of a short-range transmitter 18 to distribute information pointers, and a data entry mechanism (not shown) for transferring data into the transmitter 18.

The function of the present invention is to allow local agents, like buildings, billboards 20 and vehicles 14, to make information available to mobile information terminals 12. This function is achieved through the use of short-range transmitters 18 which broadcast Internet URLs 22 on a known frequency. Mobile information terminals 12, such as those mounted in automobiles, receive the URLs 22 and store them in a queue. The terminal's user then has the opportunity to retrieve any URL and access the World Wide Web (WWW) document addressed by that URL. In this discussion, the term document refers to any WWW object which may be referred to by URL, including various kinds of mixed and non-text media, and also the results of Internet programs which are accessed by URLs.

Figure 2:
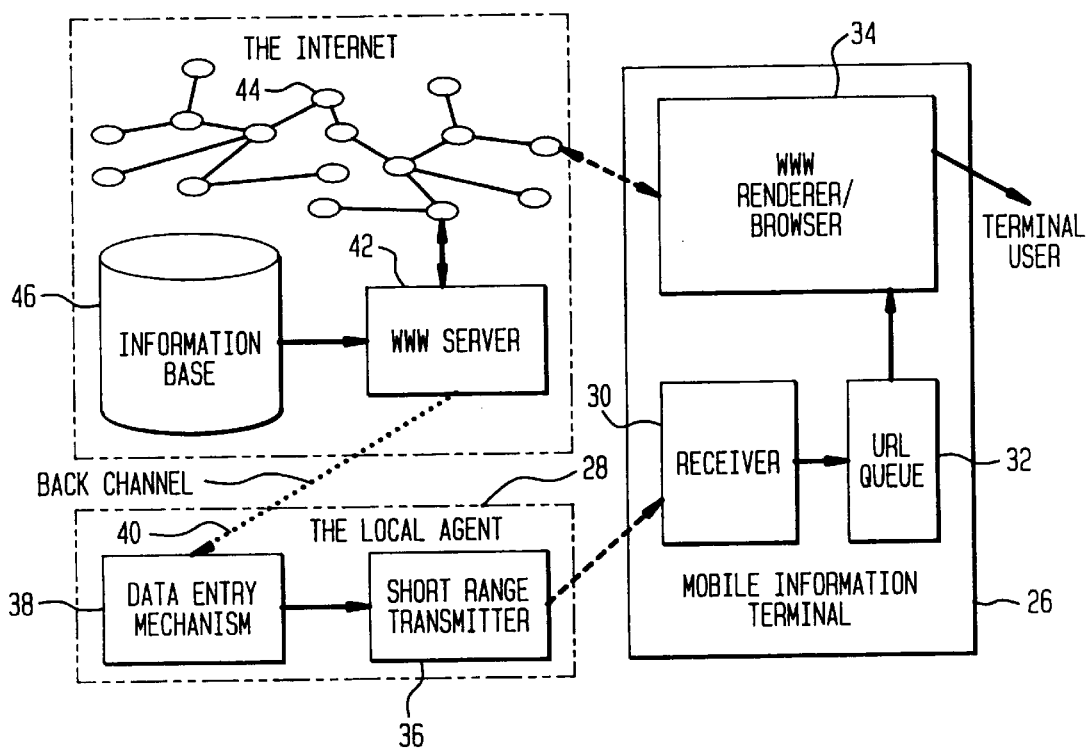
FIG. 2 illustrates the architecture of the ABU-DaBII system of the present invention.

FIG. 2. illustrates a block diagram of the architecture of the present invention. As stated above, the present invention includes a mobile information terminal 26 as the output device to the user and a local agent 28 which is locally operated. The mobile information terminal 26 includes a receiver 30, a URL queue 32 and a WWW renderer/browser 34. The local agent 28 includes a short-range transmitter 36 to distribute information pointers to the mobile information terminal 26 and a data entry mechanism 38 for transferring data into the transmitter 36.

As the mobile agent moves, it may enter the range of many such transmitting agents, and it collects the URLs as it travels. The operator of the transmitting agent uses the data entry mechanism 38 to update the URL which it transmits. An optional back channel 40 can be provided between the WWW server 42 and the data entry mechanism 38 to allow events from the Internet 44 to update the URL being transmitted. The WWW server 42 interfaces with the Internet 44 and an information base 46.

The local agent 28 is the system which provides the Internet URL to the mobile information terminal 26. It consists of the short range transmitter 36 and the data entry system 38.

Figure 3:
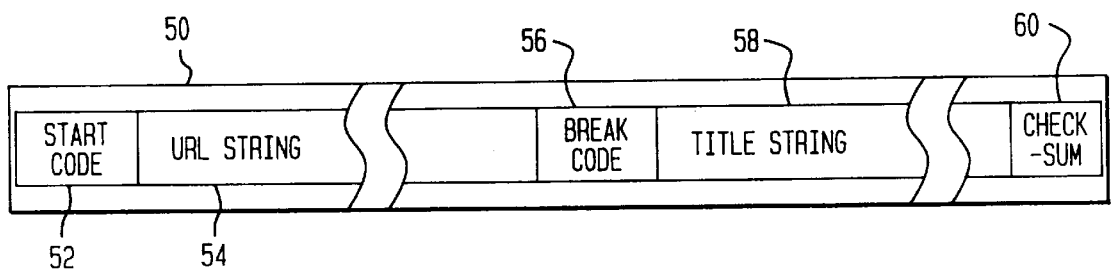
FIG. 3 illustrates the structure of the Actively Broadcast URLs (ABU) of the present invention.

The short range transmitter 36 broadcasts a signal on one of a set of known frequencies, with a range long enough to only reach the conduit for the mobile agents (such as a highway, if the mobile agents are in automobiles). Such a transmitter may utilize either an RF or optical transfer mechanism. The signal that it broadcasts is called an Actively Broadcast URL (ABU). As shown in FIG. 3, each ABU 50 consists of a start code 52, a URL string 54, a break code 56, a title string 58, and a checksum code 60. The strings in the ABU 50 are represented as sequences of ASCII characters, although the codes need not be. The broadcast of an ABU 50 is repeated continuously. An extended system may alternate between several different ABUs 50, as deemed appropriate by the operator of the local agent (28 of FIG. 2).

The structure of an ABU 50 will now be described. The start code 52 is a unique signal which designates the beginning of an ABU 50. The start code 52 serves as a delimiter between ABUs. The break code 56 is a unique code which is broadcast between the URL 54 and the title string 58 and serves to delimit them. The checksum code 60 uses some agreed upon standard error detection or correction encoding of the URL 54 and title strings 58.

The URL follows any standard conventions for Internet URLS, and for example may make use of HTTP or RealMedia protocols, as well as include information coded in the Common Gateway Interface (CGI) to Internet executable programs. The URL may also contain placeholder variables which may be filled in by the mobile information terminal when it attempts to use the URL to retrieve a WWW document.

The title string 58 contains information to identify the URL 54 to the user of the mobile information terminal (26 of FIG. 2). This information serves as the anchor for the hyperlink implied by the URL 54.

The total length of the ABU 50 is restricted depending on the available broadcast data bandwidth, and the length of time during which the mobile agent is expected to be in range of the local agent and not of interfering signals. For example, if a local agent on a highway can expect automobile-based mobile agents to be in range for 2 seconds, and the available broadcast data bandwidth is 1200 bps, then the signal is limited to 300 bytes, (2 seconds*1200 bits/second*1 byte/8 bits=300 bytes). Since the average user will arrive in the middle of a broadcast, the functional limit would be one half or 150 bytes.

The following will describe the data entry mechanism (38 of FIG. 2). The URL 54 and the title string 58 contained within the ABU 50 are entered into the short range transmitter 36 by the local agent operator using the data entry mechanism 38 In the event that many different ABUs are being broadcast by the same local agent, all of them are entered though the data entry mechanism. The data entry mechanism is used to change the values of the URL and title string whenever a change is desired by the operator.

The data entry mechanism could take many different forms. It could be a small terminal attached directly to the short range transmitter, a portable terminal which can plug into a transmitter, a remote terminal which connects to the transmitter via cable or wireless connection, or any other mechanism which allows ASCII characters to be entered into the transmitter.

The mobile information terminal, 26 of FIG. 2, is a device carried by a mobile agent which can receive an ABU, use it to retrieve a WWW document, and potentially alert the user to the new ABU and render the WWW document. An example of a mobile agent is an automobile, but potentially any mobile system (pedestrian, robot, train, etc.) could make use of such a terminal. The terminal 26 consists of three parts, a receiver 30, a URL queue 32, and a WWW browser 34 which includes the capability to retrieve and render WWW documents and to interact with the terminal user.

The receiver 30 is a device for receiving ABU transmissions. It listens on all of the set of designated frequencies for any ABU broadcasts. It ignores all information it receives on any given frequency until it receives a start code, and from that point it begins to store the string it receives as the URL. When it receives a break code, it concludes storing the URL and begins storing the title string. When the checksum code is received, the storing is concluded, and the receiver checks to ensure that the ABU has been received correctly. If not, it attempts some recovery procedure: either applying an error correction algorithm or listening on the frequency again, depending on the implementation. When an ABU is received correctly, the URL and title strings are passed to the URL queue.

The receiver continues to listen on all designated frequencies, and can receive multiple ABUs concurrently, discarding them or passing them to the URL queue 32 depending on the success of the transmission.

The URL queue unit 32 is a repository for URLs and title strings, made of standard digital memory. The strings are stored as sequences of ASCII characters, in URL/title pairs. New URL/title pairs arrive from the receiver, and pairs may be requested by the WWW browser. Optionally, the queue unit may have a facility to alert the terminal user when a new URL has been received and is available. URL/title pairs are replaced in FIFO manner, that is, when the queue is full, the least recently received pair is dropped to make room for any new pair.

The WWW browser 34 may have many features and capabilities which are independent of the ABU-DaBII system. In order to support ABU-DaBII, it must have at least the following capabilities: it must be able to retrieve a WWW document from the Internet 44 given a URL; it must be able to receive URL/title pairs from the URL queue unit; and it must be able to fill in any placeholder variables in the URL. It probably should also be able to render WWW documents and provide a browsing interface to the terminal user, although these capabilities may not be necessary for all applications.

The precedence with which URL/title pairs are sent by the queue unit to the WWW browser may vary depending on the preferences of the user or the browser developer, but the following is an example of a simple and effective protocol which can used in most circumstances. Each time a new URL/title pair is received by the queue unit, it sends an alert message to the WWW browser. When the browser requests a URL from the queue unit, the queue unit provides a URL given the following precedence:

1. The most recently received URL which has not yet been delivered to the browser,
2. If all URLs have been delivered, the most recently received URL which has already been delivered.

This protocol could be used as in the following example. The automobile is passing through a commercial zone with many stores employing local agents. Upon passing a particular store, a passenger wonders what products are currently on sale. He clicks the "grab URL" button on his browser. The browser asks the queue for the most recent URL/title pair, and then renders the title to the user. However, in this case the most recent URL is not from the desired store, as the user can determine from the rendered title. So the user presses "grab" again, and the browser gets the next most recent URL. Eventually, the desired title is retrieved and rendered, and the user can use the browser to "follow the link", that is, retrieve the WWW document from the Internet using the associated URL.

ABU-DabII also includes a system for passing custom information from the mobile information terminal to remote Internet programs. The local agent 28 may have included placeholder variables in the URL which it broadcast. These variables allow the browser to customize the user's use of the WWW on the user's behalf. The WWW browser inserts a value into the URL, in place of the placeholder variable, which is commensurate with the mobile agent's situation and the user's preference. For example, a URL could reference a CGI program which takes as parameters the current gasoline level of the vehicle and its fuel efficiency, and suggests a gas station at an appropriate distance. Such a URL might look like this: http://www.service.com/station?*GAS_LEVEL**FUEL_EFFICY*. The local agent would use placeholders in the URL for the CGI parameters, and these placeholders would be filled with appropriate values by the WWW browser when the document is accessed. In this instance, the placeholder for "GAS_LEVEL" would be replaced by the current gas level of the car, and the placeholder for "FUEL EFFICY" would be replaced by the fuel efficiency rating of the car. In this way, the local agent operator could give information to the driver, based on the driver's immediate and specific situation. Obviously, the driver would have to previously specify which information he was willing to give out.

The Internet 44 is not actually part of the ABU-DaBII system, but it does serve as the repository for the documents which contain the information provided by the local agent operator to the mobile agent user.

One optional feature of an ABU-DaBII system is to provide a back channel though which information gathered on the Internet could be used to update the local agent. For example, after a certain number of people had accessed a particular document, the local agent might be automatically updated to provide a different URL. The back channel is implemented by connecting the local agent's data entry mechanism to the WWW server which provides the document, and allowing a program on the WWW server to employ the data entry mechanism to update the short range transmitter.

The following section describes some sample applications of an ABU-DaBII system. In the simplest case of a local advertisement, a local agent could be included in a store front, and the mobile agents could be in automobiles. As a driver passes by the store, if he is interested in getting information from that store, he uses his browser to get the URL from the queue and accesses the store's WWW page. The store's proprietor can have placed whatever information there he wants, including information about items on sale, rare items in stock, store hours, promotions, or anything which will encourage the driver to do business there. Restaurants could provide menus.

This kind of advertisement is not limited to storefronts, but could be used with billboards or even placarded trucks.

More sophisticated advertising is possible by customizing the advertisement to the customer. For example, the URL broadcast by the local agent could reference an Internet program using the CGI. This program could be parameterized by the local agent's location. In this way, a national advertising campaign could include information about the user's immediate location. For example, a national hotel chain could rent billboards around the country, each broadcasting the URL of the hotel's central office, but with a parameter indicating which location the user was passing. This information could be used to focus the information provided to the user on hotels in the immediate vicinity.

Still more customization can be employed through the use of placeholder variables in the broadcast URLs. For example, the user of a mobile information terminal can program the terminal with his preferences regarding types of accommodations, food, gasoline, etc. This information can then be sent as parameters to Internet programs, so that vendors of these services can ensure that the customer always receives the most relevant information about their services.

Local agents placed in street signs, traffic signals, and other locations could be used to deliver references to information about the local area. For example, WWW documents or programs could be provided to give traffic updates or weather reports for extremely localized areas. Public emergency reports could be easily distributed to motorists though such agents. Information about city ordinances, traffic rules, or information from a local chamber of commerce could be distributed in this way.

As automobile information terminals increase in sophistication the idea of automated route plotting becomes more and more reasonable. Eventually, auto-pilots which drive cars for people automatically will be developed. These route plotters and auto-pilots need information however, and the Internet is an excellent source of that information. A route-plotting program needs information about local conditions (closed roads, heavy traffic) which can be obtained from local WWW resources pointed to by ABU-DaBII local agents.

Auto-pilots will also require knowledge of their surroundings. Some of this may be provided by computer vision, but computer vision is resource intensive. Much information, for example recognizing that a gas station is closed, can be provided by local pointers to Internet information. In this way, complex image processing algorithms can concentrate on critical tasks (like staying on the road), and not be required for secondary tasks (like discovering that a road is temporarily closed).

Mobile information access will be an important tool in the next century. As information terminals become mobile, a new requirement for just-in-time information delivery will arise: the need to access information about an object or place which is adjacent. The ABU-DaBII system described in this disclosure fills that need by allowing local agents to transmit Internet pointers to mobile terminals. The Internet pointers can then be followed by the mobile terminal's user to access unlimited multimedia information provided by the local agent's operator.

It is not intended that this invention be limited to the hardware or software arrangement, or operational procedures shown disclosed. This invention includes all of the alterations and variations thereto as encompassed within the scope of the claims as follows.

What is claimed is:

1. A system for providing targeted internet information to mobile agents comprising:
   a mobile information terminal for connecting to an Internet and for providing output to a user; and,
   a local agent for transmitting actively broadcast URLs (ABUs) including variable custom information to said mobile information terminal, wherein said mobile terminal includes an application program for processing said variable custom information, and wherein the variable custom information is in the form of placeholder variable.

2. A system for providing targeted internet information to mobile agents as claimed in claim 1 wherein said mobile information terminal comprises:

receive means for receiving ABUs; and, store means for storing said ABUs in a queue.

3. A system for providing targeted internet information to mobile agents as claimed in claim 1 wherein said mobile information terminal comprises:

a receiver for receiving ABUs from said local agent;

a URL queue connected to said receiver; and, a WWW renderer/browser connected to said URL queue.

4. A system for providing targeted internet information to mobile agents as claimed in claim 1 wherein said local agent comprises:

a transmitter for transmitting said ABUs to said mobile information terminal; and, a data entry mechanism connected to said transmitter.

5. A system for providing targeted internet information to mobile agents as claimed in claim 4 wherein said local agent further comprises:

placeholder variables for allowing said mobile information terminal to customize use by said user of said Internet.

6. A system for providing targeted internet information to mobile agents as claimed in claim 4 wherein said local agent further comprises:

back channel means for connecting said data entry mechanism to a WWW server and for allowing events to update ABUs being transmitted.

7. A system for providing targeted internet information to mobile agents as claimed in claim 4 wherein said local agent further comprises:

local operation means.

8. A system for providing targeted internet information to mobile agents as claimed in claim 1 wherein said short range transmitter broadcast ABUs on one of a set of known frequencies with a range to reach said mobile information terminal.

9. A system for providing targeted internet information to mobile agents as claimed in claim 1 wherein each of said ABUs comprise:

a URL string;

a title string; and, required protocol codes.

10. A system for providing targeted internet information to mobile agents as claimed in claim 1 wherein each of said ABUs comprise:

a start code;

a URL string;

a break code;

a title string; and, a checksum code.

11. A system for providing targeted internet information to mobile agents as claimed in claim 10:

wherein said start code designates beginning of one of said ABUs;

wherein said break code is broadcast between said URL string and said title string and serves to delimit said URL string and said title string;

wherein said title string contains information to identify said URL string to said user of said mobile information terminal; and, wherein said checksum code uses standard error correction.

12. A system for providing targeted internet information to mobile agents as claimed in claim 3 wherein:

said receiver listens on all of a set of designated frequencies for any ABU broadcast and ignores all information until said receiver receives a start code and then begins to store a URL string and when one of said ABUs is received correctly, said URL string and a title string are forwarded to said URL queue.

13. A system for providing targeted internet information to mobile agents as claimed in claim 3 wherein said URL queue comprises:

standard digital memory for storing URL strings and title strings as sequences of ASCII characters in URL/title pairs.

14. A system for providing targeted internet information to mobile agents as claimed in claim 13 wherein said URL queue further comprises:

alert means for alerting said user when a new URL string has been received.

15. A system for providing targeted internet information to mobile agents as claimed in claim 3 wherein said WWW renderer/browser comprises:

retrieve means for retrieving a WWW document from said Internet;

receive means for receiving URL/title pairs from said URL queue; and, fill in means for filling in any placeholder variables in a URL string.

16. A system for providing targeted internet information to mobile agents as claimed in claim 15 wherein said WWW renderer/browser further comprises:

render means for rendering said WWW document; and, browser means for providing a browsing interface to said user.

17. A system for providing targeted internet information to mobile agents as claimed in claim 4 wherein said data entry mechanism comprises:

transfer means for transferring a URL string and a title string to said transmitter through local operation.

18. A method for providing targeted internet information to mobile agents comprising the steps of:

utilizing a mobile information terminal for connecting to an Internet and for providing an output to a user; and, utilizing a local agent for transmitting actively broadcast URLs (ABUs) including variable custom information to said mobile information terminal, wherein said mobile information terminal includes an application program for processing said ABUs including said variable custom information, and wherein the variable custom information is in the form of placeholder variable.

19. A method for providing targeted internet information to mobile agents as claimed in claim 18 wherein utilizing a mobile information terminal comprises the steps of:

receiving ABUs from said local agent;

storing said ABUs in a queue; and, utilizing a WWW renderer/browser connected to said URL queue for accessing said Internet.

20. A method for providing targeted internet information to mobile agents as claimed in claim 19 wherein utilizing a local agent comprises the steps of:

transmitting said ABUs to said mobile information terminal; and, utilizing a data entry mechanism.

21. The system according to claim 1, wherein said URLs are associated with physical objects disposed within view along a path of travel of said mobile terminal.

22. The system according to claim 21, wherein said physical objects include a billboard.

23. The system according to claim 1, further including means for passing user information from said mobile information terminal to an internet-based computer program.

24. The system according to claim 23, wherein said means for passing user information includes means for embedding placeholder variables in said URLs (ABUs) broadcasted to said mobile information terminal.

25. The system according to claim 24, wherein the user information is inserted in place of said placeholder variables.

26. The system according to claim 1, wherein the mobile information terminal sends parameters to the local agent, said parameters comprising data associated with a vehicle.

27. The method of claim 18, further including passing user information from said mobile information terminal to an internet-based computer program.

28. The method of claim 27, further including:

embedding placeholder variables in said URLs (ABUs); and broadcasting said URLs (ABUs) to said mobile information terminal.

29. The method of claim 28, further including inserting user information in the place of said placeholder variables.

30. The system according to claim 1, wherein said application program is a common gateway interface program.

* * * * *